United States Patent
Denen et al.

(10) Patent No.: US 7,211,976 B2
(45) Date of Patent: May 1, 2007

(54) CONTROL AND MOTOR ARRANGEMENT FOR USE IN MODEL TRAIN

(75) Inventors: Dennis J. Denen, Westerville, OH (US); Neil P. Young, Redwood City, CA (US); Gary L. Moreau, Rochester, MI (US); Martin Pierson, Howell, MI (US); Robert Grubba, Ormond Beach, FL (US)

(73) Assignee: Lionel L.L.C., Chesterfield, MI (US)

( * ) Notice: Subject to any disclaimer, the term of this patent is extended or adjusted under 35 U.S.C. 154(b) by 0 days.

(21) Appl. No.: 10/894,233

(22) Filed: Jul. 19, 2004

(65) Prior Publication Data

US 2005/0023999 A1 Feb. 3, 2005

Related U.S. Application Data

(63) Continuation of application No. 09/702,466, filed on Oct. 31, 2000, now Pat. No. 6,765,356, which is a continuation-in-part of application No. 09/185,558, filed on Nov. 4, 1998, now abandoned.

(51) Int. Cl.
*H02P 3/06* (2006.01)

(52) U.S. Cl. .................... 318/286; 318/282; 246/1 R; 246/187 A; 246/187 R

(58) Field of Classification Search .............. 318/3, 318/6, 139, 140, 135, 281, 282, 286, 268; 388/800, 801; 246/186, 167, 187 A, 187 R, 246/1 R See application file for complete search history.

(56) References Cited

U.S. PATENT DOCUMENTS 3,736,484 A 5/1973 Reynolds et al.
3,942,114 A 3/1976 Keeling (Continued)

FOREIGN PATENT DOCUMENTS

EP 0 226 965 A2 11/1986

(Continued)

OTHER PUBLICATIONS

AY Messeneuheiten_Nurnberger Spielwaremesse, pp. 8-9, Modellmodellbahn Elektronik, Heft 2, Apr. May 1991. Total pp. 6.

(Continued)

*Primary Examiner*—Rita Leykin
(74) *Attorney, Agent, or Firm*—O'Melveny & Myers LLP

(57) ABSTRACT

A control and motor arrangement in accordance with the present invention includes a motor configured to generate a locomotive force for propelling the model train. The control and motor arrangement further includes a command control interface configured to receive commands from a command control unit wherein the commands correspond to a desired speed. The control and motor arrangement still further includes a plurality of detectors configured to detect speed information of the motor, and a process control arrangement configured to receive the speed information from the sensors. The process control arrangement is farther configured and arranged to generate a plurality of motor control signals based on the speed information for controlling the speed of said motor. The control and motor arrangement yet still further includes a motor control arrangement configured to cause power to be applied to the motor at different times in response to the motor control signals.

79 Claims, 10 Drawing Sheets

U.S. PATENT DOCUMENTS

| | | | |
|---|---|---|---|
| 3,964,701 A | 6/1976 | Kacerek | |
| 3,994,237 A | 11/1976 | Thomsen | |
| 3,999,108 A | 12/1976 | Tanikoshi | |
| 4,065,767 A * | 12/1977 | Neuhof et al. | 340/384.4 |
| 4,085,356 A | 4/1978 | Meinema | |
| 4,147,939 A | 4/1979 | Russell | |
| 4,179,744 A | 12/1979 | Lowe | |
| 4,266,368 A | 5/1981 | Nyman | |
| 4,293,851 A * | 10/1981 | Beyl, Jr. | 340/384.72 |
| 4,567,757 A | 2/1986 | Melocik et al. | |
| 4,855,652 A | 8/1989 | Yamashita et al. | |
| 4,914,431 A * | 4/1990 | Severson et al. | 340/825.69 |
| 4,925,424 A | 5/1990 | Takahashi | |
| 5,088,955 A | 2/1992 | Ishimoto | |
| 5,174,216 A | 12/1992 | Miller et al. | |
| 5,184,048 A | 2/1993 | Severson et al. | |
| 5,195,920 A | 3/1993 | Collier | |
| 5,241,517 A | 8/1993 | Carolan | |
| 5,317,244 A | 5/1994 | Ishikura | |
| 5,341,453 A | 8/1994 | Hill | |
| 5,394,068 A | 2/1995 | Severson et al. | |
| 5,448,142 A * | 9/1995 | Severson et al. | 318/280 |
| 5,456,604 A | 10/1995 | Olmsted et al. | |
| 5,492,290 A | 2/1996 | Quinn et al. | |
| 5,555,815 A * | 9/1996 | Young et al. | 104/296 |
| 5,635,903 A | 6/1997 | Koike et al. | |
| 5,659,217 A | 8/1997 | Petersen | |
| 5,707,237 A | 1/1998 | Takemoto et al. | |
| 5,749,547 A | 5/1998 | Young et al. | |
| 5,773,939 A | 6/1998 | Severson et al. | |
| 5,819,189 A * | 10/1998 | Kramer et al. | 701/22 |
| 5,848,791 A | 12/1998 | Beyer et al. | |
| 5,855,004 A * | 12/1998 | Novosel et al. | 704/272 |
| 5,896,017 A * | 4/1999 | Severson et al. | 312/280 |
| 5,940,005 A | 8/1999 | Severson et al. | |
| 6,014,934 A * | 1/2000 | Pierson | 105/26.05 |
| 6,033,285 A | 3/2000 | Fine et al. | |
| 6,091,887 A * | 7/2000 | Dieterle et al. | 388/811 |
| 6,095,351 A * | 8/2000 | Rossler | 213/75 TC |
| 6,179,105 B1 | 1/2001 | Haass | |
| 6,194,856 B1 | 2/2001 | Kobayashi et al. | |
| 6,220,377 B1 | 4/2001 | Lansberry | |
| 6,220,552 B1 | 4/2001 | Ireland | |
| 6,351,096 B1 | 2/2002 | Jang | |
| 2001/0005001 A1 | 6/2001 | Ireland | |

FOREIGN PATENT DOCUMENTS

JP          2000342862 A2     6/1999

OTHER PUBLICATIONS

AZ Marklin_Digital Zug um Zug, Folge 5, Mehr FahrspaB im Modellbahnfuhrerstand, pp. 12-14, By: F. Roxheimer, Marklin Magazine Jun. 1991. Total pp. 5.

\* cited by examiner

CONTROL AND MOTOR ARRANGEMENT FOR USE IN MODEL TRAIN

CROSS REFERENCE TO RELATED APPLICATIONS

This application is a Continuation of U.S. application Ser. No. 09/702,466, filed Oct. 31, 2000 now U.S. Pat. No. 6,765,356, now pending and hereby incorporated by reference in its entirety, which is a Continuation-in-Part of U.S. application Ser. No. 09/185,558 filed Nov. 4, 1998, now abandoned.

FIELD OF THE INVENTION

The present invention relates to model railroads. More particularly, the present invention relates to control and motor arrangements for use in model trains.

BACKGROUND

Model train systems have been in existence for many years. In a typical model train system, the model train engine is an electrical engine that receives power from a voltage that is applied to the tracks and picked up by the train motor. A transformer is used to apply the power to the tracks. The transformer controls both the amplitude and polarity of the voltage, thereby controlling the speed and direction of the train. In HO systems, the voltage is a DC voltage. In Lionel® systems, the voltage is an AC voltage transformed from the 60 Hz line voltage provided by a standard wall socket.

Some conventional types of model train systems are susceptible to performance degradation related to track irregularities. For example, uneven portions of the track can cause the model train to intermittently lose contact with the track, causing power to be inadvertently removed from the train. Unwanted stopping can result. In addition, upward and downward grades in the track can cause the model train to travel slower or faster than desired due to the effects of gravity. Moreover, certain model train systems fail to adequately simulate the effects of inertia. For example, in some systems, when power is removed from the train, the train stops moving immediately. By contrast, real world trains do not stop immediately when brakes are applied. Accordingly, in some model train systems, play-realism is reduced by these sudden stops.

SUMMARY OF THE INVENTION

A control and motor arrangement installed in a model train is presented. A motor control arrangement in accordance with the present invention includes a motor configured and arranged to generate a locomotive force for propelling the model train. The control and motor arrangement further includes a command control interface configured to receive commands from a command control unit wherein the commands correspond to a desired speed. The control and motor arrangement in accordance with the present invention still further includes a plurality of detectors configured to detect speed information of said motor and a process control arrangement configured to receive the speed information from the plurality of sensors. The process control arrangement is further configured and arranged to generate a plurality of motor control signals based on the speed information for controlling the speed of said motor. The control and motor arrangement in accordance with the present invention yet still further includes a motor control arrangement configured to cause power to be applied to the motor at different times in response to the motor control signals.

BRIEF DESCRIPTION OF THE DRAWINGS

These and other aspects and advantages of the present invention will become apparent upon reading the following detailed description and upon reference to the drawings, in which.

Figure 1:
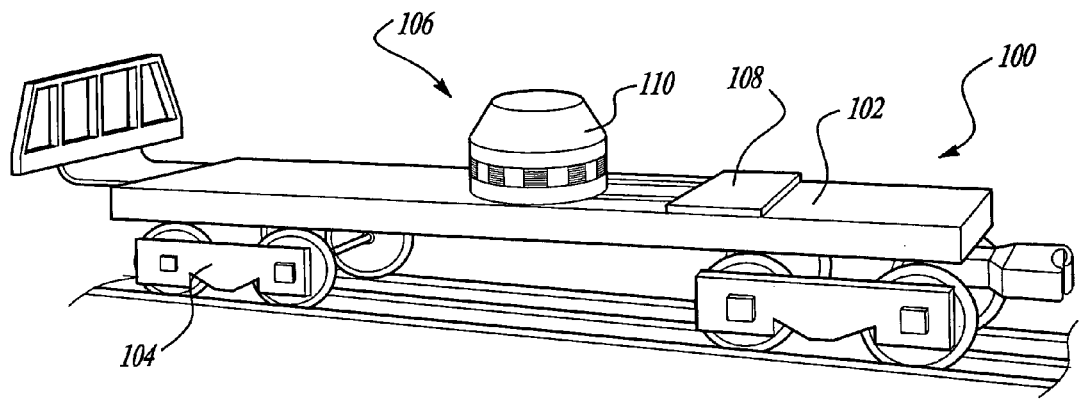
FIG. 1 illustrates an example control and motor arrangement installed in a model train, according to an embodiment of the present invention.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of model railroad systems. The invention has been found to be particularly advantageous in environments in which it is desirable to operate a model train under a variety of rail conditions. An appreciation of various aspects of the invention can be gained through a discussion of various application examples operating in such environments.

According to one embodiment of the present invention, a control arrangement receives information from a model train motor regarding the current speed and position of the motor. This information is used to maintain a constant operating speed of the motor over a variety of rail conditions, including, for example, changes in grade. The motor realizes higher torque and efficiency. In addition, jerking and other adverse effects commonly associated with low speed operation of the motor are reduced. Furthermore, an inertial effect can be simulated by continuing to operate the motor for a duration after a main power source is disconnected from the motor. In another particular embodiment of the present invention, two or more motors are disposed on opposite surfaces of a control arrangement. Using multiple motors increases the locomotive power available to the model train.

In still another particular embodiment of the present invention, the motor speed and position information, as well as information relating to power consumption by the motor, is provided to a sound control system. The sound control system uses this information in selecting sounds to generate, enhancing the realism of the model railroad system and, for many hobbyists, the level of enjoyment.

Referring now to the drawings, FIG. 1 depicts a control and motor arrangement installed in a model train 100. The model train 100 includes a platform 102, under which a wheeled carriage 104 is mounted to support the model train 100 on a track (not shown). A control and motor arrangement 106 is mounted on a top surface of the platform 102. The control and motor arrangement 106 includes a control arrangement 108, which is coupled to control the amount of power supplied to a motor 110. This motor 110 can be implemented using any of a variety of motor types, including, for example, a DC can-type, ODYSSEY™-type, or PULLMOR™-type motor, commercially available from Lionel LLC of Chesterfield, Mich. Those skilled in the art will recognize that other motor types can be used in the alternative, and that the preceding examples are provided by way of illustration and not limitation. The control arrangement receives from the motor 110 speed information relating to the current rotational speed of the motor 110 and uses this information to adjust the amount of power applied to the motor 110 using a closed feedback loop.

In addition, the control arrangement 108 optionally further receives from the motor 110 information relating to, for example, the position within the rotational cycle of the motor 110 and/or the amount of power consumed by the motor 110. This information is used in deciding how much power to apply to the motor 110. For example, slow rotation of the motor 110 can indicate that the model train 100 is traveling along an upward slope. To compensate for this slope, the control arrangement 108 supplies additional power to the motor 110. By compensating for variations along the model railroad track, the control arrangement 108 maintains the motor 110 at a constant rotational speed, if the user so desires.

The control arrangement 108 can also be used to produce other effects that enhance the sense of realism a user enjoys when operating the model train 100. For example, a real train is significantly affected by inertia. This effect can be observed both when the train starts and stops moving. When a real train starts moving, it does not accelerate to full speed immediately. On the contrary, the train accelerates slowly due to inertia. This effect can be simulated in the model train 100 by applying power to the motor 110 gradually, even when the user commands the model train 100 to assume full speed immediately. Just as a real train typically does not accelerate to full speed instantaneously, it does not, under normal operating conditions, immediately halt when power is removed. Rather, inertia causes the train to continue to move for some time before coming to a halt. This gradual stopping can be simulated in the model train 100 by supplying power to the motor 110 from an alternate power source, such as a battery (not shown), for a time after the primary power source is disconnected from the motor 110.

The information provided by the motor 110 to the control arrangement 108 is optionally also provided to other systems in the model train 100, such as a sound control system. The sound control system can use this information in generating realistic sound effects. For example, if the sound control system receives an indication that the motor 110 is drawing a relatively large amount of power without a correspondingly large increase in speed, the sound control system can fairly conclude that the motor 110 has to work harder to maintain the model train 100 at a constant speed. The sound control system can then select or generate a sound effect that simulates the sound of a train engine straining to drive a train up a hill.

Figure 2:
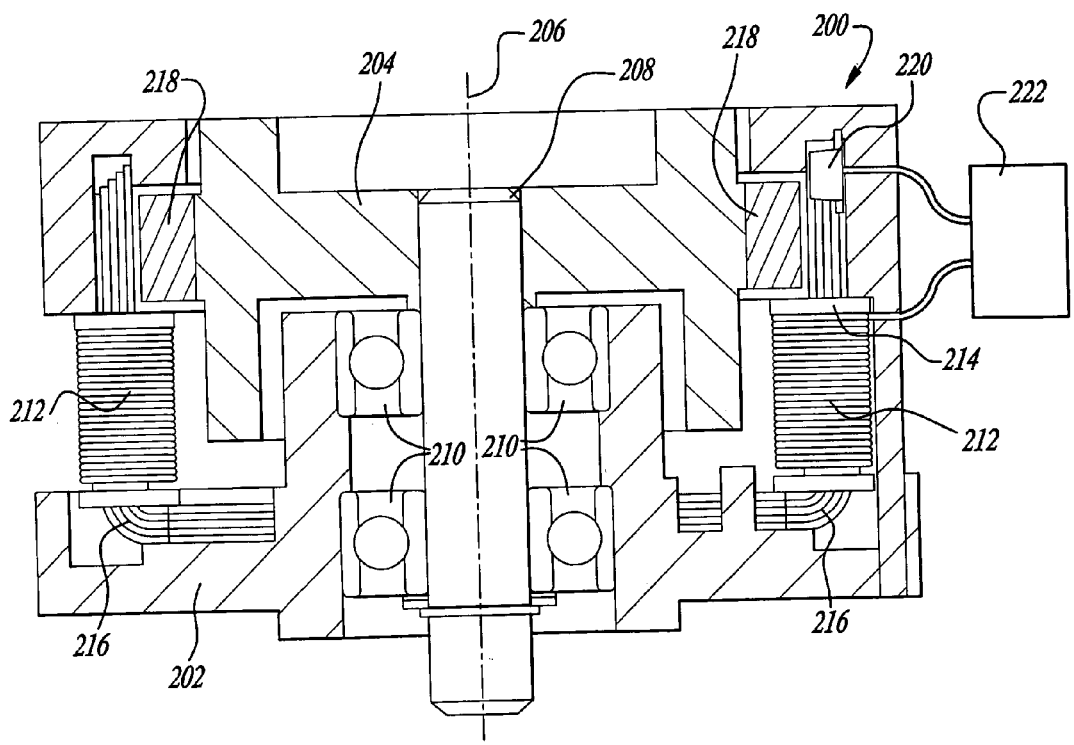
FIG. 2 is a profile view, in section, of an example control and motor arrangement for use in a model train, according to another embodiment of the present invention.

FIG. 2 illustrates an example control and motor arrangement 200 for use in a model train. A circular base 202 forms a support structure, upon which a rotor 204 is mounted. The rotor 204 rotates about an axis 206 when the control and motor arrangement 200 is energized, driving a motor shaft 208 into rotation about the axis 206. The motor shaft 208 is supported by a bearing structure comprising spaced apart bearings 210.

Figure 3:
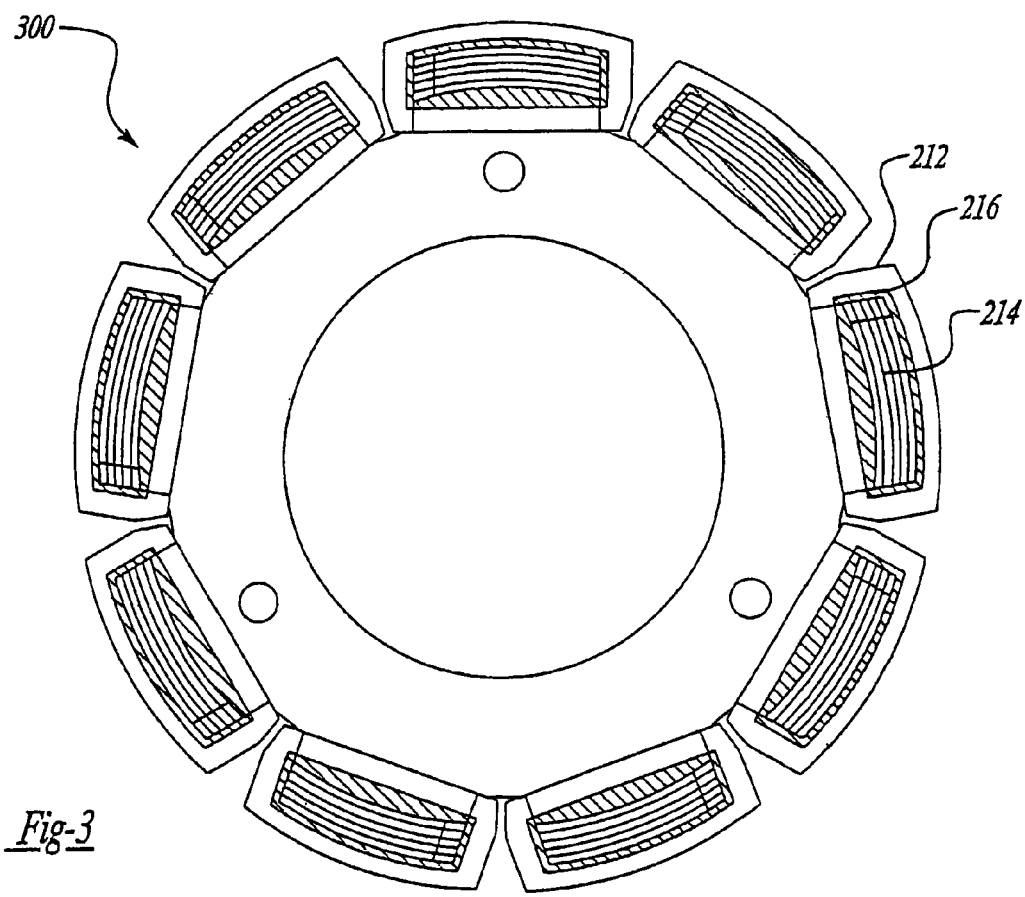
FIG. 3 is a plan view of an example control and motor arrangement for use in a model train, according to another embodiment of the present invention.

When the motor is energized, a plurality of windings 212 wound around respective bobbins 214 interact to generate an electromagnetic field within laminar core components 216 and the base 202. This field interacts with magnets 218 mounted on the rotor 204, causing the rotor 204 to rotate about the axis 206. The motor shaft 208 is thus driven into rotation. FIG. 3 illustrates in plan view one example of a configuration of windings 212 and core components 216. In the particular example illustrated in FIG. 3, a stator winding assembly 300 consists of nine core components 216 and associated bobbins 214 and windings 212.

As the motor shaft 208 rotates, a plurality of rotation sensors, one of which is depicted at reference numeral 220, detect the change in position of the rotor 204. These rotation sensors 220 can be implemented, for example, using conventional Hall effect detectors. The Hall effect detectors sense voltages produced by changes in the electromagnetic field set up by the windings 212. In a particular embodiment of the present invention, a plurality of Hall effect detectors, e.g., three, are evenly disposed around the circumference of the control and motor arrangement 200. With this configuration of rotation sensors 220, the voltage produced in each rotation sensor 220 varies as a function of the position of the rotor 204 with respect to the base 202.

A control circuit arrangement 222 is connected to the motor. The control circuit arrangement 222 receives input from the Hall effect detectors and determines, from the voltages produced in each detector, the position of the rotor 204 in the rotation cycle. In addition, the control circuit arrangement 222 monitors changes in the voltages produced in the detector to infer how quickly the rotor position changes, i.e., the rotational speed of the rotor 204.

The control circuit arrangement 222 uses this speed and positional information to determine whether, and to what extent, to alter the amount of power supplied to the motor. For example, if the control circuit arrangement 222 determines that the rotor 204 is rotating slowly for the amount of power supplied to it, the control circuit arrangement 222 can command that more power be supplied to the motor. According to a particular embodiment of the present invention, the speed and positional information is also provided to a sound control arrangement (not shown) to facilitate the generation of sound effects with enhanced realism.

Figure 4:
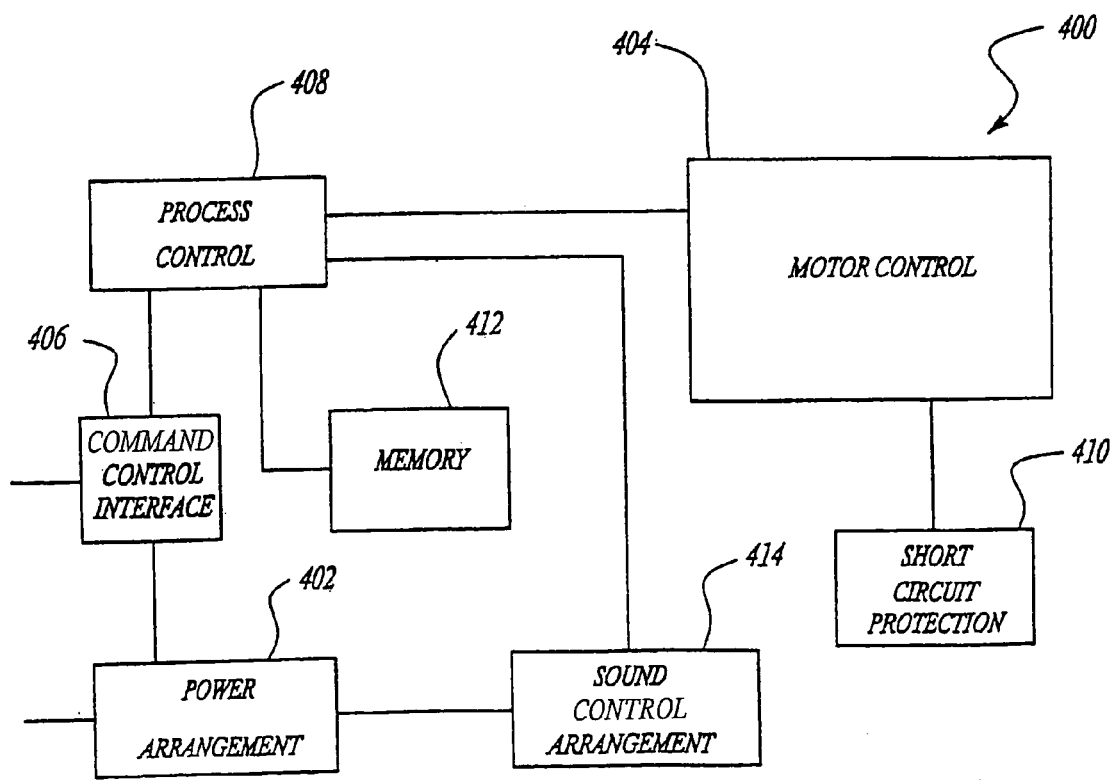
FIG. 4 is a block diagram illustrating an example control arrangement forming part of a control and motor arrangement for use in a model train, according to yet another embodiment of the present invention.

FIG. 4 illustrates in block diagram form an example control circuit arrangement 400 forming part of a control and motor arrangement, according to another embodiment of the present invention. A power arrangement 402 supplies power to the system. The power arrangement 402 receives power from the model railroad track and also includes a battery circuit to supply power in certain situations, such as when the model train travels over an uneven portion of the track and makes only intermittent contact with the track. Power is supplied to a motor control arrangement 404, which creates the rotating magnetic field that drives the motor. The power arrangement 402 also provides power to other components of the system, such as a sound control arrangement.

A radio control interface 406 provides an interface between the control arrangement 400 and a radio controller unit operated by the user. The radio controller unit is used to access various functions, such as speed control, sound effects, and the like. A process control arrangement 408 receives commands from the radio control interface 406 and maintains the speed of the motor at the desired level. For example, if the user commands the model train to run at 40 mph, the process control arrangement 408 maintains the speed at 40 mph, compensating for such factors as upward or downward grades or curves in the track. The process control arrangement 408 also detects faults in the system, such as short circuits. In the event of a short circuit, a short circuit protection arrangement 410 disengages power from the motor when the current flow exceeds a predefined threshold.

The process control arrangement 408 accesses a memory 412, which stores certain user-defined information. For example, the user can define a relationship between the rotational speed of the motor and a corresponding speed of the model train. In a particular embodiment of the present invention, the memory 412 is implemented using a nonvolatile memory to facilitate storage of the user-defined information after power is removed from the system.

A sound information arrangement 414 detects certain operating conditions of the model train and transmits information relating to these conditions to a sound control arrangement (not shown). For example, the sound information arrangement 414 is configured to detect whether the train is traversing a grade and, if so, whether the grade is upward or downward. The sound control arrangement processes this information and selects appropriate sound effects to enhance the sense of realism. For example, if the model train is moving uphill, the process control arrangement 408 senses that more power is required to maintain a constant speed. The process control arrangement 408 thus increases the power supply to the motor. In addition, the sound information arrangement 414 informs the sound control arrangement that more power has been supplied to the motor. The sound control arrangement then selects a sound effect consistent with additional power, such as increased simulated diesel engine noise.

Figure 5A:
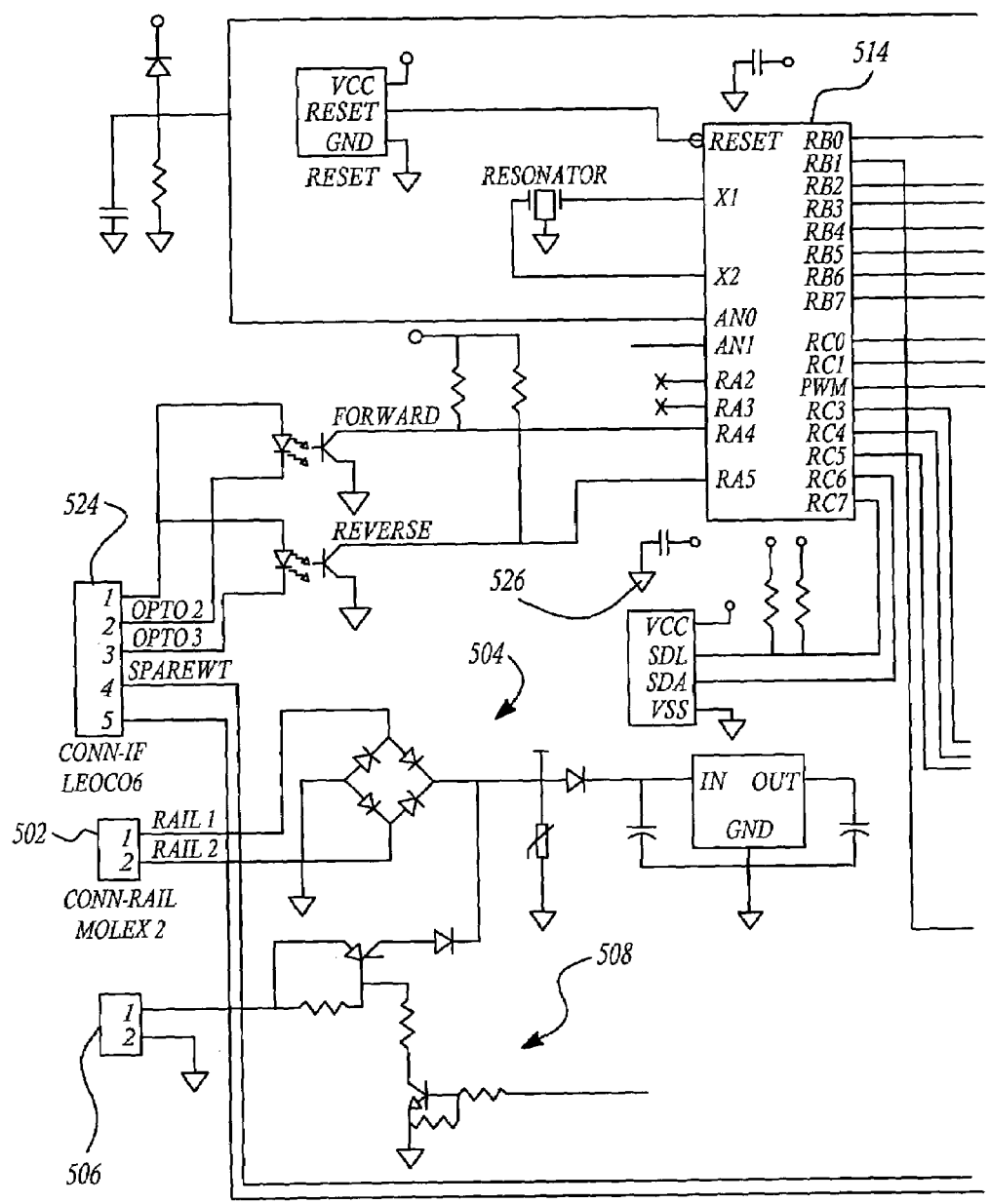
FIGS. 5A and 5B are portions of a schematic diagram depicting an example circuit arrangement for implementing the control arrangement illustrated in FIG. 4.
Figure 5B:
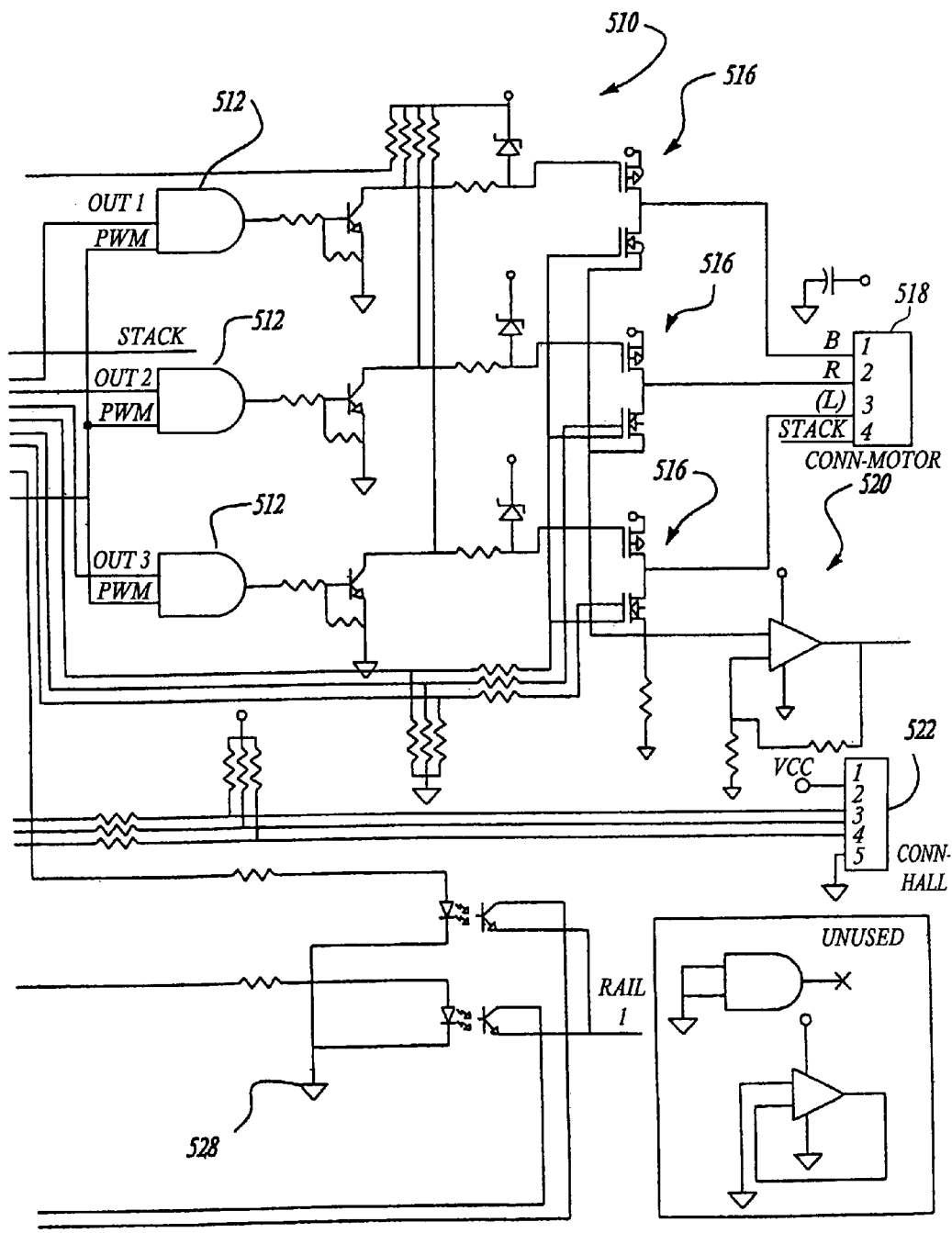

FIGS. 5A and 5B illustrate an example circuit arrangement implementing the control arrangement 400 of FIG. 4, according to a particular embodiment of the present invention. Primary power is supplied to the circuit from a connection 502 to a rail power supply. A rectifier arrangement 504 converts the AC voltage between the rails to a DC voltage for use by the train. In addition, a connection 506 to a battery serves as an alternate power source when, for example, contact with the rails is interrupted. With the battery serving as a secondary power source, the train maintains operation in the event of such interruptions. A battery circuit 508 conveys power from the battery to the control arrangement 400.

A motor controller 510 is responsible for generating the rotating magnetic field that drives the train motor. In the specific embodiment illustrated in FIGS. 5A and 5B, this magnetic field is generated in three alternating zones. These three zones correspond to three AND gates 512, each of which receives as input a pulse width modulation signal PWM and a control signal OUTi. The control signals OUTi are provided by a process controller 514, the operation of which is discussed in detail below. When the control signal OUTi and the pulse width modulation signal PWM are both active for a particular AND gate 512, power is supplied to a corresponding portion of the motor through a CMOS arrangement 516 and a motor connection 518. As each portion of the motor receives power in turn, a magnetic field is generated in that portion of the motor. A short circuit protection circuit 520 provides a path to ground in the event of a short circuit. The control signals OUTi are generated by the process controller 514 so as to cause the field to rotate around the motor.

To generate the control signals OUTi, the process controller 514 monitors the rotational speed of the motor using an input 522 coupled to, for example, a Hall effect sensor. Monitoring the speed of the motor enables the process controller 514 to maintain a constant speed, if desired, over a variety of track conditions. For example, if the process controller 514 senses that the motor is rotating slowly relative to the amount of power supplied to it, it can infer that the train is traveling uphill or over otherwise challenging terrain and apply more power to the motor. Similarly, if the process controller 514 detects that the motor is rotating quickly relative to the amount of power supplied to it, the process controller 514 can decrease the amount of power supplied to the motor to maintain a constant speed. In this manner, the process controller 514 uses speed control closed loop feedback to maintain the motor at a constant operating speed, regardless of track conditions, when desired.

In addition to the speed of the motor, the process controller 514 optionally receives other inputs that determine the proper amount of power to supply to the motor. For instance, as illustrated in FIGS. 5A and 5B, the process controller 514 receives information from a user-operated remote control through a radio control interface 524. This information includes, for example, the desired simulated speed of the train, directional control information, and commands to effect simulation of various sound effects.

The determination of how much power to supply to the motor depends not only on the input from the remote control and the current speed of the motor, but also on certain user-defined information, such as a mapping between a real-world train speed to be simulated and an actual speed of the model train. In the embodiment illustrated in FIGS. 5A and 5B, this user-defined information is stored in a nonvolatile memory 526, such as a ROM or an EPROM.

According to a particular embodiment of the present invention, the process controller 514 outputs speed information to a sound control circuit (not shown) using an output interface 528. The sound control circuit uses the speed information to determine how to generate or select an appropriate, realistic sound effect. For example, a horn can be programmed to sound relatively quietly when the train is running slowly, but forcefully as the train picks up speed.

Figure 6:
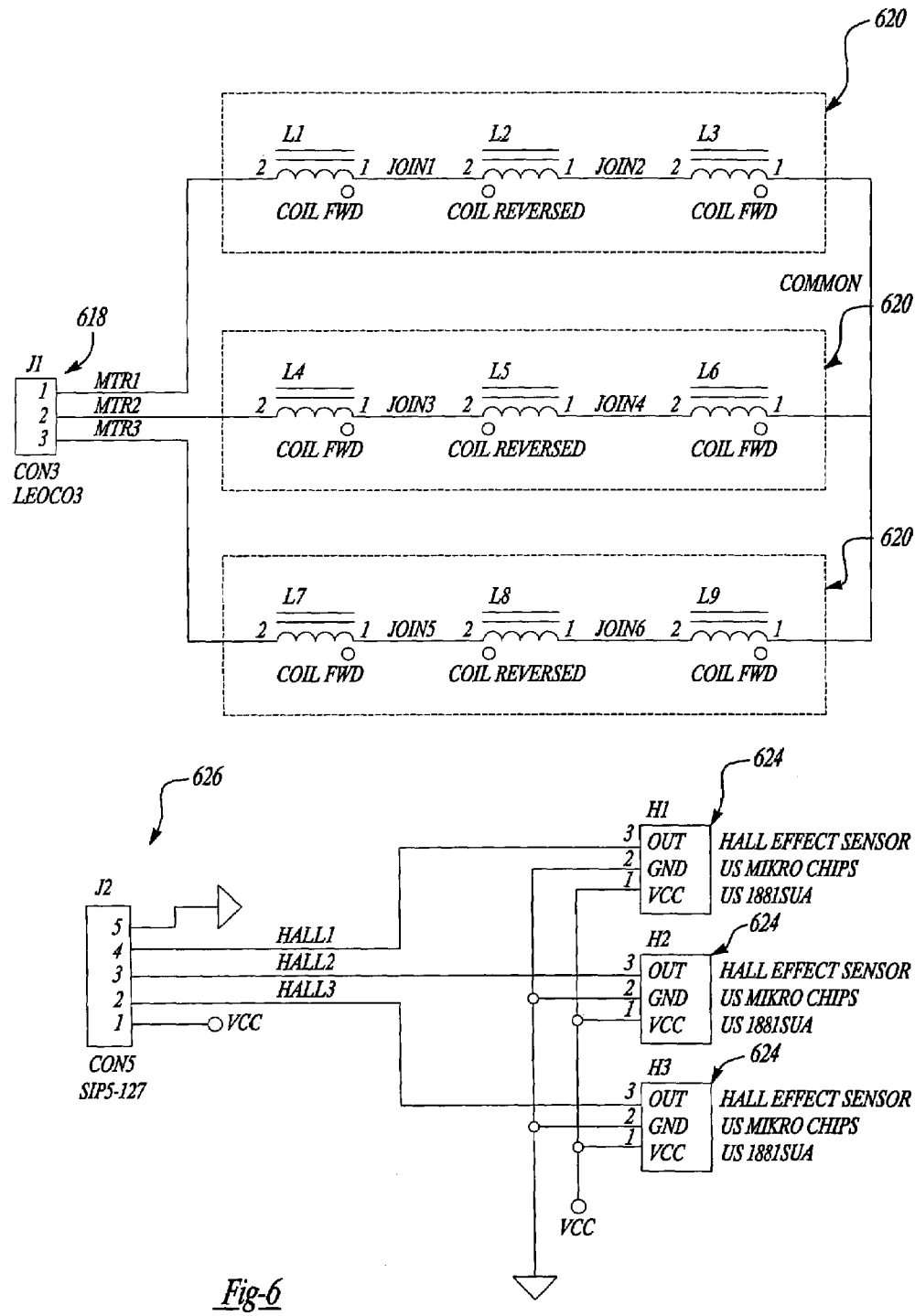
FIGS. 6, 7A–7D, and 8 are portions of a schematic diagram depicting another example circuit arrangement for implementing the control arrangement illustrated in FIG. 4.
Figure 7A:
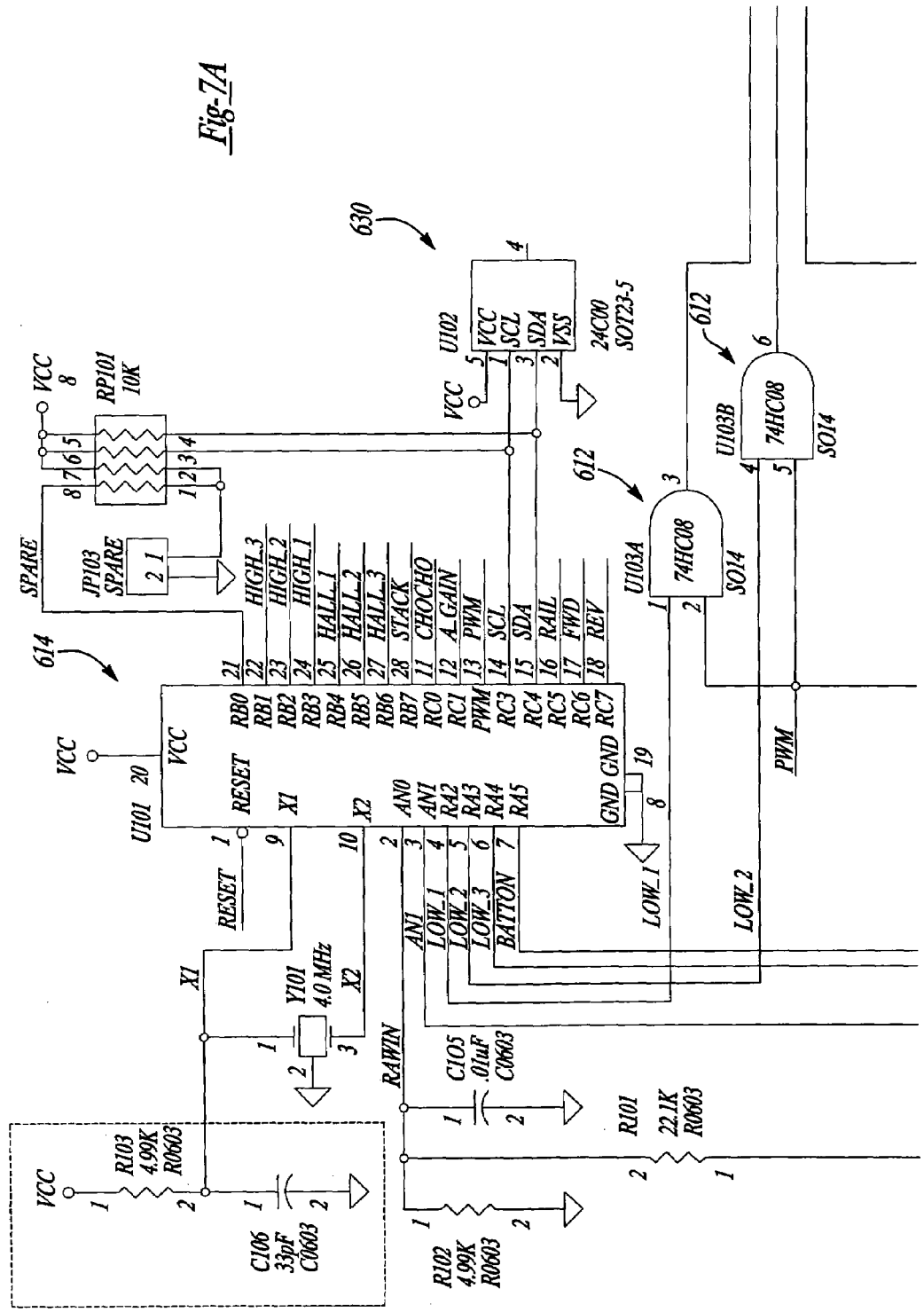
Figure 7B:
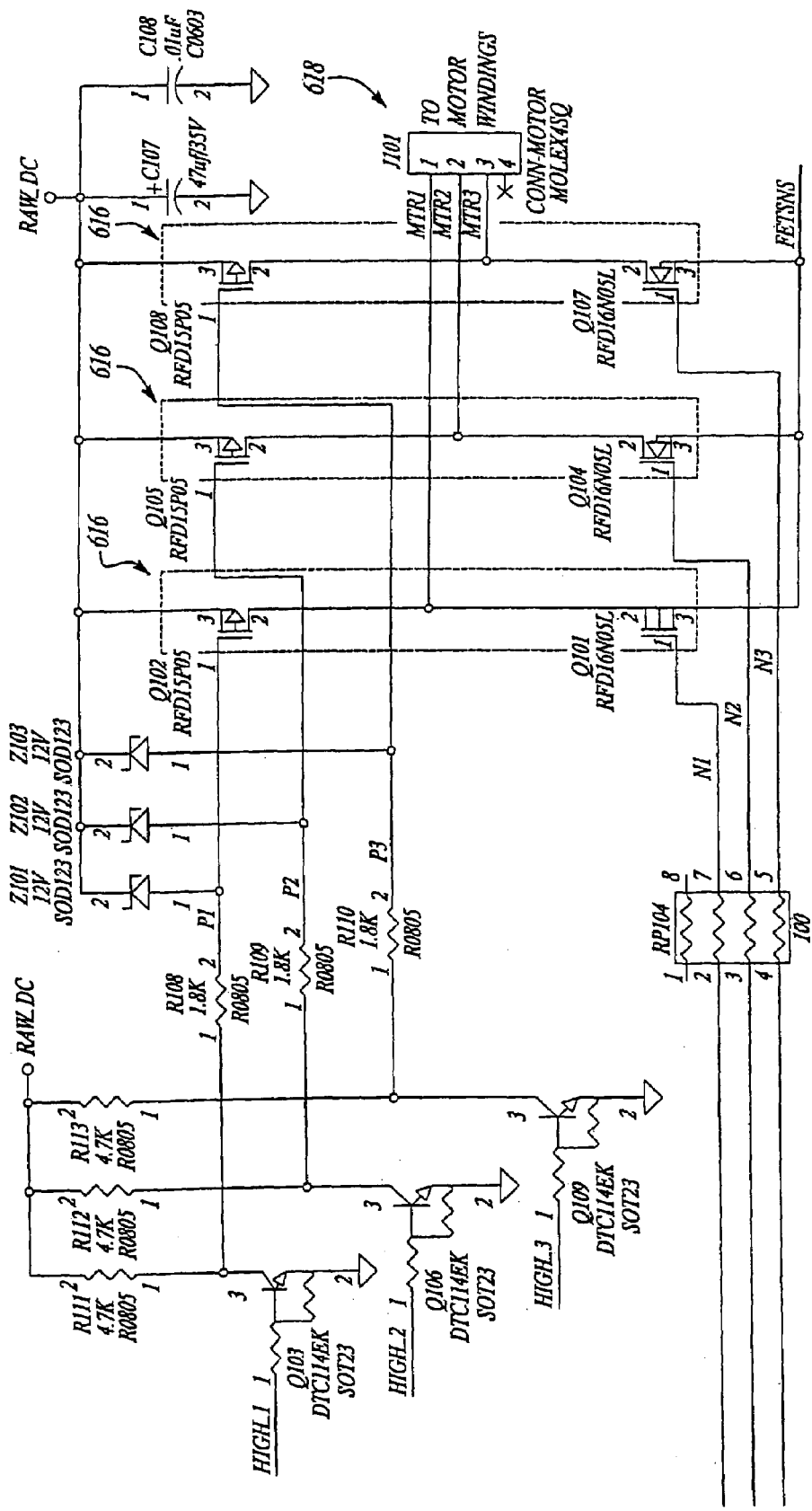
Figure 7C:
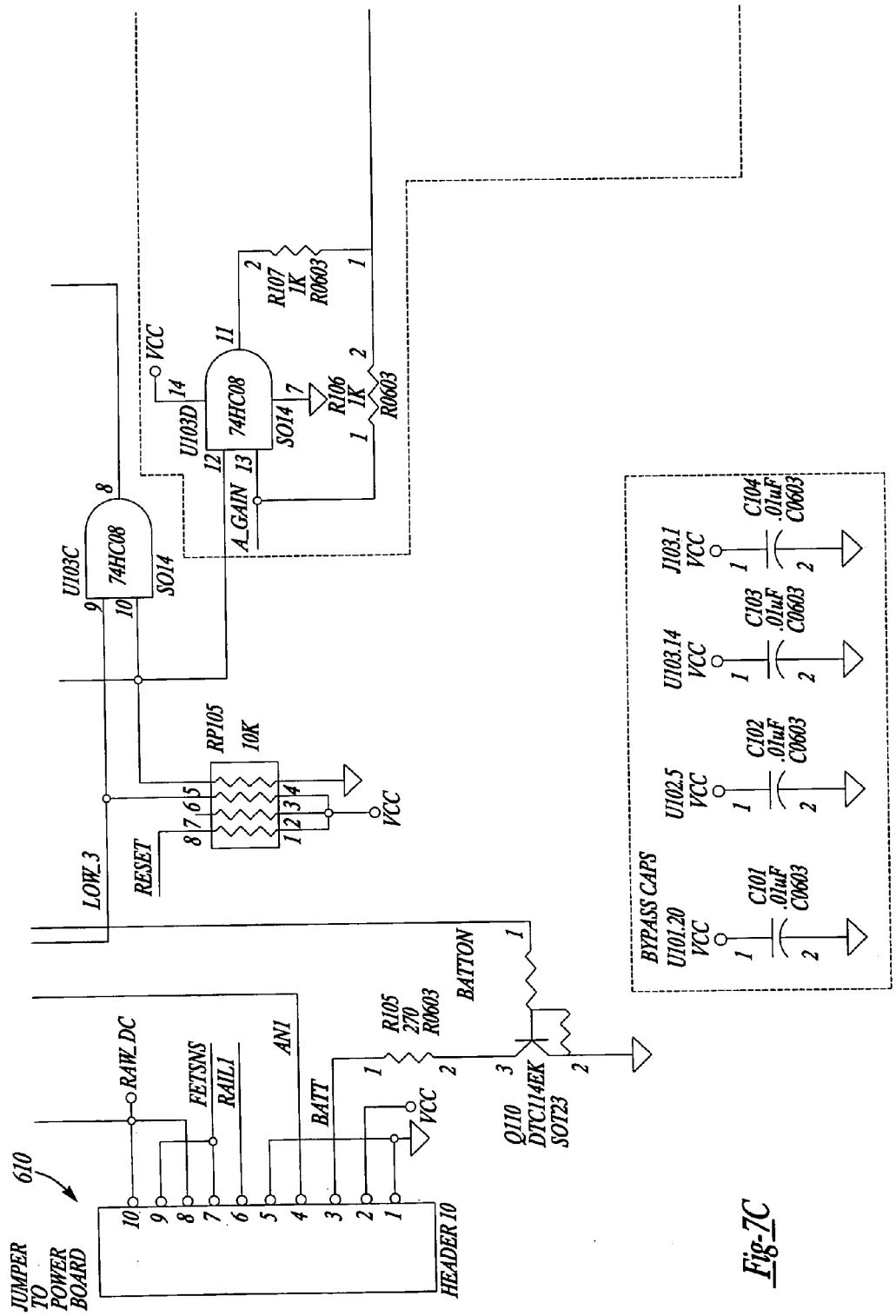
Figure 7D:
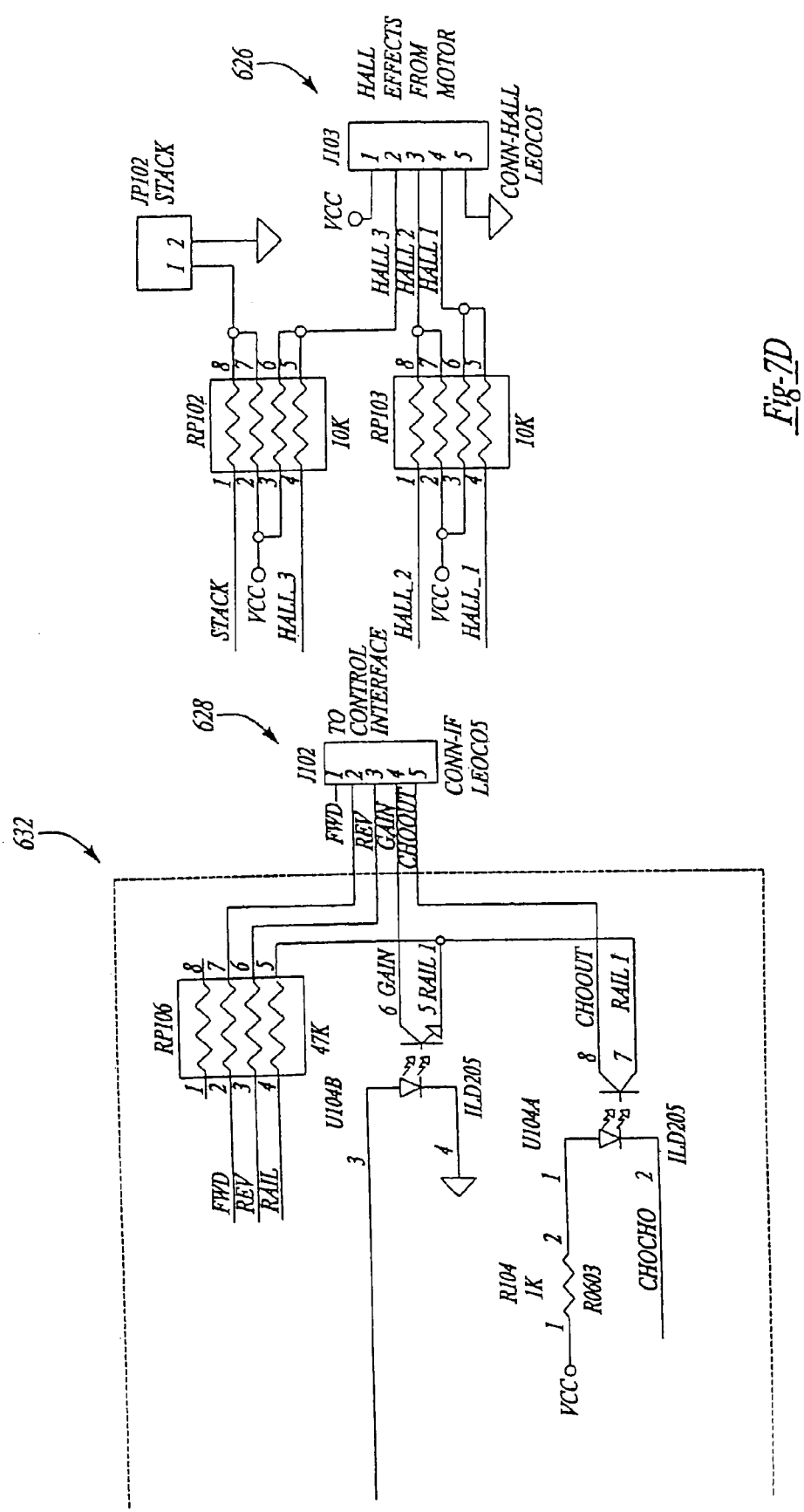
Figure 8:
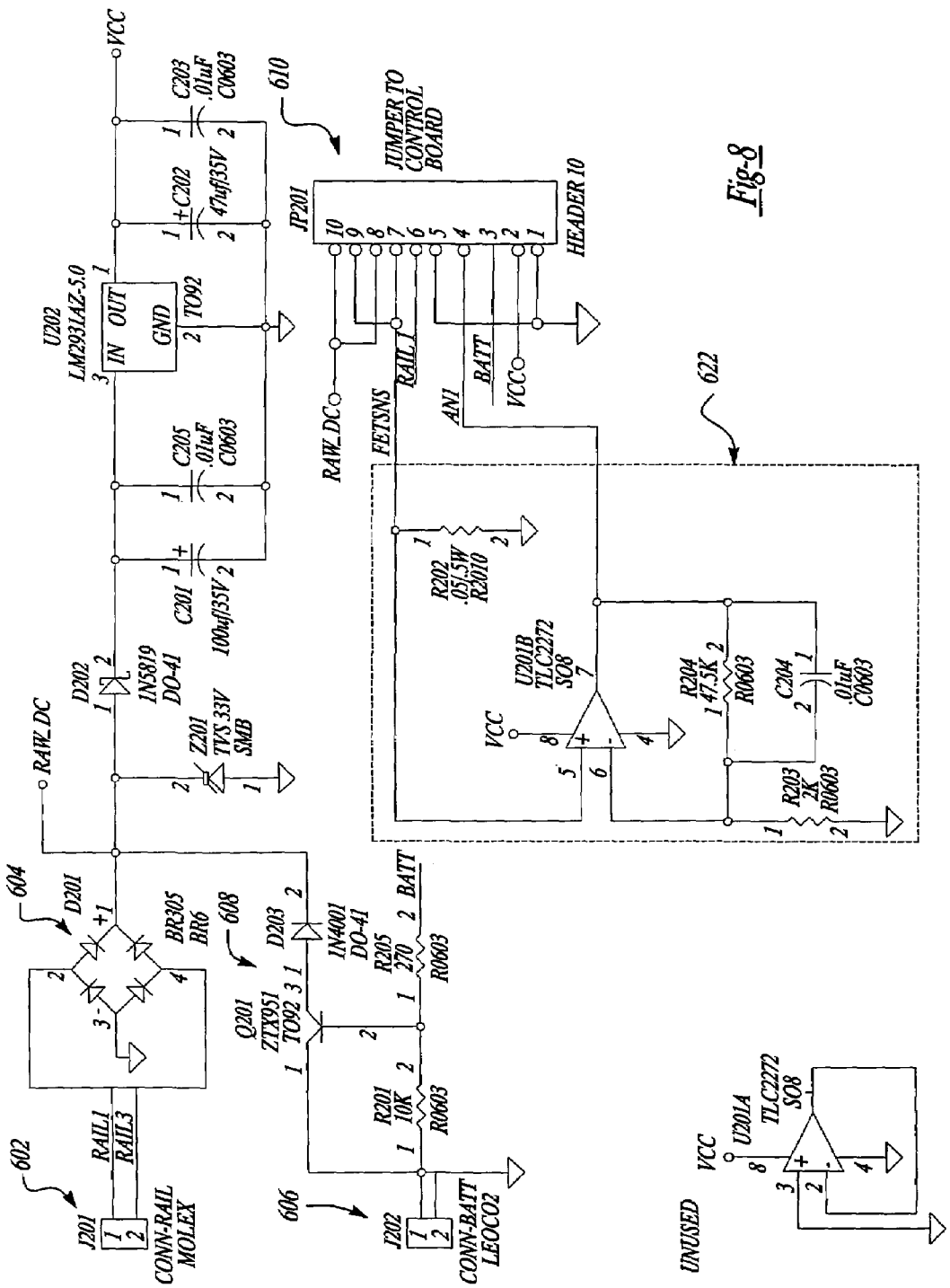

FIGS. 6–8 depict another example circuit arrangement implementing the control arrangement 400 of FIG. 4, according to still another embodiment of the present invention. In the circuit arrangement illustrated in FIGS. 6–8, prim' power is supplied to the circuit from a connection 602, illustrated on FIG. 8, to a rail power supply. A full-wave rectifier bridge 604 converts the AC voltage between the rails to a DC voltage for use by the train. In addition, a connection 606 to a battery serves as an alternate power source when contact with the rails is interrupted. The train can thus maintain operation even when such interruptions occur. A battery circuit 608 conveys power from the battery to the control arrangement 400 through a connection 610.

To drive the train motor, the control arrangement generates a rotating field. In the specific embodiment illustrated in FIGS. 6–8, the magnetic field is generated in three alternating zones, each corresponding to an AND gate 612. Each AND gate 612 receives as input a pulse width modulation signal PWM and a control signal LOW_1, LOW_2, or LOW_3. These signals are generated by a microprocessor 614, the operation of which is discussed in further detail below. When the control signal LOW_n (where n is 1, 2, or 3) and the pulse width modulation signal PWM are both active for a particular AND gate 612, power is supplied to a corresponding portion of the motor using a respective CMOS arrangement 616. A motor connector 618 provides power to a respective zone of the motor. On FIG. 6, the zones are depicted at reference numerals 620. As each zone of the motor receives power in turn, a magnetic field is generated in that zone. A short circuit protection circuit, depicted at reference numeral 622 on FIG. 8, provides a path to ground in the event of a short circuit. The microprocessor 614 generates the control signals LOW_n so as to cause the field to rotate around the motor.

To generate the control signals LOW_n, the microprocessor 614 monitors the rotational speed of the motor using interfaces (624 of FIG. 6) to Hall effect sensors (not shown). A connector 626 connects the interfaces 624 to the microprocessor 614. By monitoring the motor speed, the microprocessor 614 can use closed loop feedback to adjust the amount of power supplied to the motor in response to changes in motor speed. Thus, the microprocessor 614 can maintain a constant speed over a variety of track conditions, such as changes in grade.

The microprocessor 614 can also receive other inputs to influence the amount of power to be supplied to the motor. For example, a connection 628 to a control interface enables the hobbyist to provide additional information to the microprocessor 614 using a user-operated radio controller. This information includes, for example, the desired simulated speed of the train, directional control information, and commands to effect simulation of various sound effects. User-defined information, such as a mapping between a real-world train speed to be simulated and an actual speed of the model train, also affects the determination of the amount of power to supply to the motor. In the embodiment illustrated in FIGS. 6–8, this user-defined information is stored in a non-volatile memory 630.

According to a particular embodiment of the present invention, the microprocessor 614 outputs speed information to a sound control circuit (not shown) using an output interface 632. The sound control circuit uses the speed information to determine how to generate or select an appropriate, realistic sound effect. For example, a horn can be programmed to sound relatively quietly when the train is moving slowly, but forcefully as the train speed increases. It should be noted that, in the embodiment depicted in FIGS. 6–8, either resistor R106 or resistor R107 of the output interface 632 is installed. In one embodiment, resistor R106 is installed to allow direct pin control of audio gain control. As an alternative, resistor R107 can be installed instead, allowing gating of the PWM signal.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A model train, comprising:
   a train car including a wheeled carriage adapted to travel on a track;
   a motor operatively coupled to the carriage to thereby cause the train car to travel along the track in at least one direction;
   a sensor operatively coupled to the motor and providing a signal corresponding to a rotational speed of the motor and a rotational position of the motor;
   a controller operatively coupled to the motor and the sensor, the controller regulating an amount of power provided to the motor responsive to the signal from the sensor in order to maintain the rotational speed of the motor at a substantially constant level; and
   a sound generator operatively coupled to the controller, the sound generator providing simulated train sound effects in correspondence with at least one of the rotational speed of the motor and the rotational position of the motor;
   wherein the controller is further adapted to receive at least one command signal from a remote control unit.

2. The model train of claim 1, wherein the at least one command signal provides a desired speed for the model train, the controller thereby regulating power to the motor to achieve the desired speed.

3. A model train, comprising:
   a train car including a wheeled carriage adapted to travel on a track;
   a motor operatively coupled to the carriage to thereby cause the train car to travel along the track in at least one direction;
   a sensor operatively coupled to the motor and providing a signal corresponding to a rotational speed of the motor and a rotational position of the motor;
   a controller operatively coupled to the motor and the sensor, the controller regulating an amount of power provided to the motor responsive to the signal from the sensor in order to maintain the rotational speed of the motor at a substantially constant level; and
   a sound generator operatively coupled to the controller, the sound generator providing simulated train sound effects in correspondence with at least one of the rotational speed of the motor and the rotational position of the motor;
   wherein the controller further comprises a memory storing user-defined information.

4. The model train of claim 3, wherein the user-defined information includes data defining a relationship between the rotational rate of the motor and corresponding speed of the model train.

5. The model train of claim 3, wherein the memory further comprises a non-volatile memory.

6. A model train, comprising:
   a train car including a wheeled carriage adapted to travel on a track;
   a motor operatively coupled to the carriage to thereby cause the train car to travel alone the track in at least one direction;
   a sensor operatively coupled to the motor and providing a signal corresponding to a rotational speed of the motor and a rotational position of the motor;
   a controller operatively coupled to the motor and the sensor, the controller regulating an amount of power provided to the motor responsive to the signal from the sensor in order to maintain the rotational speed of the motor at a substantially constant level; and a sound generator operatively coupled to the controller, the sound generator providing simulated train sound effects in correspondence with at least one of the rotational speed of the motor and the rotational position of the motor;

wherein the sound generator is adapted to detect operating conditions of the model train based at least in part upon the amount of power provided to the motor.

7. The model train of claim 6, wherein the sound generator selects a sound effect in correspondence with the amount of power provided to the motor.

8. The model train of claim 6, wherein the sound generator selects a sound effect corresponding to increased load upon detection of an increased amount of power provided to the motor.

9. The model train of claim 6, wherein the sound generator selects a sound effect corresponding to decreased load upon detection of a decreased amount of power provided to the motor.

10. The model train of claim 6, wherein the sound generator is adapted to detect the model train traveling up a grade and provide a corresponding sound effect.

11. The model train of claim 6, wherein the sound generator is adapted to detect the model train traveling down a grade and provide a corresponding sound effect.

12. The model train of claim 6, wherein the sound generator selects a sound effect in correspondence with the speed of the model train.

13. The model train of claim 6, wherein the sensor further comprises at least one Hall effect device.

14. A model train, comprising:
a train car including a wheeled carriage adapted to travel on a track;
a motor operatively coupled to the carriage to thereby cause the train car to travel along the track in at least one direction;
a sensor operatively coupled to the motor and providing a signal corresponding to a rotational speed of the motor and a rotational position of the motor;
a controller operatively coupled to the motor and the sensor, the controller regulating an amount of power provided to the motor responsive to the signal from the sensor in order to maintain the rotational speed of the motor at a substantially constant level; and
a sound generator operatively coupled to the controller, the sound generator providing simulated train sound effects in correspondence with at least one of the rotational speed of the motor and the rotational position of the motor;
wherein the sensor further provides a signal synchronized to the rotational position of the motor.

15. The model train of claim 14, the sound generator further provides simulated train sound effects synchronized with the rotational position of the motor.

16. A control system for a model train, comprising:
a motor arranged to cause the model train to travel along a track;
a sensor operatively coupled to the motor and providing a signal corresponding to a rotational rate of the motor and a rotational position of the motor;
a controller operatively coupled to the motor and the sensor, the controller regulating an amount of power provided to the motor responsive to the signal from the sensor in order to maintain the rotational speed of the motor at a substantially constant level; and
a sound generator operatively coupled to the controller, the sound generator providing simulated train sound effects in correspondence with at least one of the rotational rate of the motor and the rotational position of the motor;
wherein the controller is further adapted to receive at least one command signal from a remote control unit.

17. The control system of claim 16, wherein the at least one command signal provides a desired speed for the model train, the controller thereby regulating power to the motor to achieve the desired speed.

18. The control system of claim 16, wherein the controller further comprises a memory storing user-defined information.

19. The control system of claim 18, wherein the user-defined information includes data defining a relationship between the rotational speed of the motor and corresponding speed of the model train.

20. The control system of claim 18, wherein the memory further comprises a non-volatile memory.

21. A control system for a model train, comprising:
a motor arranged to cause the model train to travel along a track;
a sensor operatively coupled to the motor and providing a signal corresponding to a rotational rate of the motor and a rotational position of the motor;
a controller operatively coupled to the motor and the sensor, the controller regulating an amount of power provided to the motor responsive to the signal from the sensor in order to maintain the rotational speed of the motor at a substantially constant level; and
a sound generator operatively coupled to the controller, the sound generator providing simulated train sound effects in correspondence with at least one of the rotational rate of the motor and the rotational position of the motor;
wherein the sound generator is adapted to detect operating conditions of the model train based at least in part upon the amount of power provided to the motor.

22. The control system of claim 21, wherein the sound generator selects a sound effect in correspondence with the amount of power provided to the motor.

23. The control system of claim 21, wherein the sound generator selects a sound effect corresponding to increased load upon detection of an increased amount of power provided to the motor.

24. The control system of claim 21, wherein the sound generator selects a sound effect corresponding to decreased load upon detection of a decreased amount of power provided to the motor.

25. The control system of claim 21, wherein the sound generator is adapted to detect the model train traveling up a grade and provide a corresponding sound effect.

26. The control system of claim 21, wherein the sound generator is adapted to detect the model train traveling down a grade and provide a corresponding sound effect.

27. The control system of claim 16, wherein the sound generator selects a sound effect in correspondence with the speed of the model train.

28. The control system of claim 16, wherein the sensor further comprises at least one Hall effect device.

29. The control system of claim 16, wherein the sensor further provides a signal corresponding to the rotational position of the motor.

30. The control system of claim 29, the sound generator further provides simulated train sound effects in correspondence with the rotational position of the motor.

31. A model train, comprising:
a train car including a wheeled carriage adapted to travel on a track;
a motor operatively coupled to the carriage to thereby cause the train car to travel along the track in at least one direction;
a sensor operatively coupled to the motor and providing a signal corresponding to a rotational speed of the motor; and
a controller operatively coupled to the motor and the sensor, the controller being responsive to at least one user command signal defining a desired speed for the model train, the controller including a memory storing user-defined information defining a relationship between the rotational rate of the motor and corresponding speed of the model train, the controller thereby regulating an amount of power provided to the motor in accordance with the user-defined information and responsive to the signal from the sensor and the at least one user command signal in order to maintain the model train at the desired speed.

32. The model train of claim 31, wherein the memory further comprises a non-volatile memory.

33. The model train of claim 31, further comprising a sound generator operatively coupled to the controller, the sound generator providing simulated train sound effects in correspondence with the rotational speed of the motor.

34. The model train of claim 33, wherein the sound generator is adapted to detect operating conditions of the model train based at least in part upon the amount of power provided to the motor.

35. The model train of claim 33, wherein the sound generator selects a sound effect in correspondence with the amount of power provided to the motor.

36. The model train of claim 33, wherein the sound generator selects a sound effect corresponding to increased load upon detection of an increased amount of power provided to the motor.

37. The model train of claim 33, wherein the sound generator selects a sound effect corresponding to decreased load upon detection of a decreased amount of power provided to the motor.

38. The model train of claim 33, wherein the sound generator is adapted to detect the model train traveling up a grade and provide a corresponding sound effect.

39. The model train of claim 33, wherein the sound generator is adapted to detect the model train traveling down a grade and provide a corresponding sound effect.

40. The model train of claim 33, wherein the sound generator selects a sound effect in correspondence with the speed of the model train.

41. The model train of claim 31, wherein the sensor further comprises at least one Hall effect device.

42. The model train of claim 31, wherein the sensor provides a signal corresponding to rotational position of the motor.

43. The model train of claim 31, further comprising a sound generator operatively coupled to the controller, the sound generator providing simulated train sound effects in correspondence with the rotational position of the motor.

44. A control system for a model train, comprising:
a motor arranged to cause the model train to travel along a track;
a sensor operatively coupled to the motor and providing a signal corresponding to a rotational speed of the motor; and
a controller operatively coupled to the motor and the sensor, the controller being responsive to at least one user command signal defining a desired speed for the model train, the controller including a memory storing user-defined information defining a relationship between the rotational rate of the motor and corresponding speed of the model train, the controller thereby regulating an amount of power provided to the motor in accordance with the user-defined information and responsive to the signal from the sensor and the at least one user command signal in order to maintain the model train at the desired speed.

45. The control system of claim 44, wherein the memory further comprises a non-volatile memory.

46. The control system of claim 44, further comprising a sound generator operatively coupled to the controller, the sound generator providing simulated train sound effects in correspondence with the rotational speed of the motor.

47. The control system of claim 46, wherein the sound generator is adapted to detect operating conditions of the model train based at least in part upon the amount of power provided to the motor.

48. The control system of claim 46, wherein the sound generator selects a sound effect in correspondence with the amount of power provided to the motor.

49. The control system of claim 46, wherein the sound generator selects a sound effect corresponding to increased load upon detection of an increased amount of power provided to the motor.

50. The control system of claim 46, wherein the sound generator selects a sound effect corresponding to decreased load upon detection of a decreased amount of power provided to the motor.

51. The control system of claim 46, wherein the sound generator is adapted to detect the model train traveling up a grade and provide a corresponding sound effect.

52. The control system of claim 46, wherein the sound generator is adapted to detect the model train traveling down a grade and provide a corresponding sound effect.

53. The control system of claim 46, wherein the sound generator selects a sound effect in correspondence with the speed of the model train.

54. The control system of claim 44, wherein the sensor further comprises at least one Hall effect device.

55. The control system of claim 44, wherein the sensor provides a signal corresponding to rotational position of the motor.

56. The control system of claim 55, further comprising a sound generator operatively coupled to the controller, the sound generator providing simulated train sound effects in correspondence with the rotational position of the motor.

57. A model train, comprising:
a train car including a wheeled carriage adapted to travel on a track;
a motor operatively coupled to the carriage to thereby cause the train car to travel along the track in at least one direction;
a sensor operatively coupled to the motor and providing a signal corresponding to a rotational speed of the motor and a rotational position of the motor;
a radio control interface adapted to receive at least one user command signal; and
a controller operatively coupled to the motor, the sensor and the radio control interface, the controller regulating an amount of power provided to the motor responsive to the signal from the sensor and the at least one user command signal in order to maintain the motor at a substantially constant speed.

58. The model train of claim 57, wherein the controller further includes a memory storing user-defined information defining a relationship between the rotational speed of the motor and corresponding speed of the model train.

59. The model train of claim 58, wherein the memory further comprises a non-volatile memory.

60. The model train of claim 57, further comprising a sound generator operatively coupled to the controller, the sound generator providing simulated train sound effects in correspondence with the sensor signal.

61. The model train of claim 60, wherein the sound generator is adapted to detect operating conditions of the model train based at least in part upon the amount of power provided to the motor.

62. The model train of claim 60, wherein the sound generator selects a sound effect in correspondence with the amount of power provided to the motor.

63. The model train of claim 60, wherein the sound generator selects a sound effect corresponding to increased load upon detection of an increased amount of power provided to the motor.

64. The model train of claim 60, wherein the sound generator selects a sound effect corresponding to decreased load upon detection of a decreased amount of power provided to the motor.

65. The model train of claim 60, wherein the sound generator is adapted to detect the model train traveling up a grade and provide a corresponding sound effect.

66. The model train of claim 60, wherein the sound generator is adapted to detect the model train traveling down a grade and provide a corresponding sound effect.

67. The model train of claim 60, wherein the sound generator selects a sound effect in correspondence with the speed of the model train.

68. The model train of claim 57, wherein the sensor further comprises at least one Hall effect device.

69. A model train, comprising:
 a train car including a wheeled carriage adapted to travel on a track;
 a motor operatively coupled to the carriage to thereby cause the train car to travel along the track in at least one direction;
 a sensor operatively coupled to the motor and providing a signal corresponding to a rotational speed of the motor;
 a radio control interface adapted to receive at least one user command signal defining a desired speed;
 a controller operatively coupled to the motor, the sensor and the radio control interface, the controller regulating an amount of power provided to the motor responsive to the signal from the sensor and the at least one user command signal in order to maintain the rotational speed of the motor at the desired speed; and
 a sound generator operatively coupled to the controller, the sound generator providing simulated train sound effects in correspondence with the rotational speed of the motor.

70. The model train of claim 69, wherein the controller further includes a memory storing user-defined information defining a relationship between the rotational speed of the motor and corresponding speed of the model train.

71. The model train of claim 70, wherein the memory further comprises a non-volatile memory.

72. The model train of claim 69, wherein the sound generator is adapted to detect operating conditions of the model train based at least in part upon the amount of power provided to the motor.

73. The model train of claim 69, wherein the sound generator selects a sound effect in correspondence with the amount of power provided to the motor.

74. The model train of claim 69, wherein the sound generator selects a sound effect corresponding to increased load upon detection of an increased amount of power provided to the motor.

75. The model train of claim 69, wherein the sound generator selects a sound effect corresponding to decreased load upon detection of a decreased amount of power provided to the motor.

76. The model train of claim 69, wherein the sound generator is adapted to detect the model train traveling up a grade and provide a corresponding sound effect.

77. The model train of claim 69, wherein the sound generator is adapted to detect the model train traveling down a grade and provide a corresponding sound effect.

78. The model train of claim 69, wherein the sound generator selects a sound effect in correspondence with the rotational speed of the motor.

79. The model train of claim 69, wherein the sensor further comprises at least one Hall effect device.

* * * * *